US007659952B2

United States Patent
Kobayashi

(10) Patent No.: US 7,659,952 B2
(45) Date of Patent: Feb. 9, 2010

(54) COLOR-FILTER SUBSTRATE, METHOD AND APPARATUS FOR MANUFACTURING COLOR-FILTER SUBSTRATE, AND LIQUID CRYSTAL DISPLAY AND METHOD FOR MANUFACTURING LIQUID CRYSTAL DISPLAY

(75) Inventor: Shigeki Kobayashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 643 days.

(21) Appl. No.: 11/436,626

(22) Filed: May 19, 2006

(65) Prior Publication Data

US 2006/0203152 A1   Sep. 14, 2006

Related U.S. Application Data

(62) Division of application No. 10/930,956, filed on Sep. 1, 2004, now Pat. No. 7,110,066.

(30) Foreign Application Priority Data

Sep. 29, 2003   (JP)   ............................. 2003-337821

(51) Int. Cl.
G02F 1/1335 (2006.01)
(52) U.S. Cl. ..................................... 349/106
(58) Field of Classification Search ........................ None
See application file for complete search history.

(56) References Cited

U.S. PATENT DOCUMENTS

| 5,796,458 | A | * | 8/1998 | Koike et al. | ................. 349/126 |
| 6,667,795 | B2 | * | 12/2003 | Shigemura | ................. 349/187 |
| 7,110,066 | B2 | * | 9/2006 | Kobayashi | ................. 349/106 |

FOREIGN PATENT DOCUMENTS

JP    A-2001-51269    2/2001

* cited by examiner

*Primary Examiner*—Timothy Rude
(74) *Attorney, Agent, or Firm*—Oliff & Berridge, PLC

(57) ABSTRACT

To make it difficult to view streak unevenness in alignment generated at the boundary of alignment layers even when an alignment-layer material is applied onto a color-filter substrate several times to form an alignment layer. When an alignment-layer material is applied onto a color-filter substrate 1 having color filters (R, G, and B) on the surface with a droplet discharge head 3 to form an alignment-layer train 4a, the lateral front end L1 of the train 4a is formed on the color filter (B) displaying blue. When the alignment-layer material is then applied to the following alignment-layer application train to form an alignment-layer train 4b, the lateral rear end L2 of the train 4b is overlapped with the lateral front end L1 of the preceding alignment-layer train 4a to form an overlapped portion 4c. Since the overlapped portion 4c is formed on the color filter (B) displaying blue which has the lowest visibility of the three primary colors of light, streak unevenness in alignment generated at the boundary is difficult to view from the exterior.

2 Claims, 5 Drawing Sheets

COLOR-FILTER SUBSTRATE, METHOD AND APPARATUS FOR MANUFACTURING COLOR-FILTER SUBSTRATE, AND LIQUID CRYSTAL DISPLAY AND METHOD FOR MANUFACTURING LIQUID CRYSTAL DISPLAY

This is a Division of application Ser. No. 10/930,956 filed Sep. 1, 2004. The disclosure of the prior application is incorporated by reference herein in its entirety.

BACKGROUND OF THE INVENTION

1. Field of Invention

The present invention relates to a color-filter substrate having an alignment layer divided in multiple alignment layer trains formed on a color filter, a method and an apparatus for manufacturing the color-filter substrate, a liquid crystal device, and a method for manufacturing the liquid crystal device.

2. Description of Related Art

Liquid crystal devices have been recently broadly used for displays of electronic equipment including cellular phones, portable computers, video cameras, projectors, etc. This type of liquid crystal device contains liquid crystal sealed between a pair of substrates and controls the state of the alignment of the liquid crystal by an electric field applied to the liquid crystal, thereby displaying images. Accordingly, liquid crystal devices have alignment layers on each of opposing surfaces of a pair of substrates, and control the state of the alignment of the liquid crystal under no electric field by the controlling force of the alignment layers. For color display in liquid crystal devices, a color filter layer is disposed under the alignment layer of one substrate.

Although flexography is well known as a method for forming an alignment layer on each substrate, a so-called droplet discharge method of forming an alignment layer on a substrate with a droplet discharge head has been recently proposed as a method of providing a relatively stable quality as compared with the flexography.

For example, a technique of forming a pattern by discharging a minute viscous material onto a substrate with an inkjet printer head has been disclosed.

SUMMARY OF THE INVENTION

When the width of an alignment-layer application area on a substrate is larger than the width of a droplet discharge head, the droplet discharge head must be moved to and fro to apply an alignment-layer material to the alignment-layer application area of the substrate several times.

In that case, when the alignment-layer material is applied to the next train following the application to the preceding train, the alignment-layer material on the preceding train has already been dried and solidified or being dried and solidified. Accordingly, the end of the alignment-layer material on the next train is overlapped with the alignment layer formed by the application of the alignment-layer material to the preceding train to eliminate the boundary of the alignment layers.

However, the alignment-layer overlapped portion becomes different in thickness from the other parts, causing unevenness in thickness. The uneven alignment layer tends to affect the pre-tilt angle of liquid crystal, which can be viewed as streak unevenness in alignment.

Accordingly, in view of the above-described problem, the present invention is directed to a color-filter substrate in which, even when an alignment-layer material is applied several times, streak unevenness in alignment generated at the boundary thereof is difficult to see from the exterior to improve the quality of products, a method and an apparatus for manufacturing the color filter, a liquid crystal device, and a method for manufacturing the liquid crystal device.

In order to achieve the above object, according to a first invention, there is provided a color-filter substrate having an alignment layer on a plurality of color filters, wherein the alignment layer divided in a plurality of alignment layer trains is formed on the color filters, the adjacent ends of the alignment layer trains are overlapped with each other to form an overlapped portion, and the overlapped portion is formed on a position corresponding to a color filter displaying a specific color.

Since the structure is constructed such that the overlapped portion of the alignment layer train is formed at a position corresponding to a color filter displaying a specific color, it is difficult to view unevenness in alignment generated by the overlapped portion from the exterior.

A second invention is characterized in that the overlap width of the overlapped portion is set within the color filter displaying a specific color in the first invention.

Since the structure is constructed such that the overlap width of the overlapped portion is set within the color filter displaying a specific color, it is more difficult to view unevenness in alignment.

A third invention is characterized in that the specific color is blue in the first or second invention.

Since the structure is constructed such that the specific color is blue which has relatively low visibility, the visibility of unevenness in alignment can be decreased more.

According to a fourth invention, there is provided a method for manufacturing a color-filter substrate by applying an alignment-layer material on a plurality of color filters to form an alignment layer, the method comprising the steps of: applying the alignment-layer material along a preset alignment-layer application train such that the lateral front end of the train corresponds to the position of a color filter displaying a specific color; and applying the alignment-layer material along the following alignment-layer application train such that the lateral rear end of the train overlaps with the front end of the alignment layer applied to the preceding alignment-layer application train and the lateral front end of the train is located at a position corresponding to the color filter displaying a specific color.

Since the structure is constructed such that the overlap width of the overlapped portion is placed at a position corresponding to the color filter displaying a specific color, manufacture is facilitated and atomization is promoted.

A fifth invention is characterized in that the overlap width of the overlapped portion is set within the color filter displaying a specific color in the fourth invention.

Since the structure is constructed such that the overlap width of the overlapped portion is set within the color filter displaying a specific color, unevenness in alignment is more difficult to view.

A sixth invention is characterized in that the alignment-layer material is applied onto the color filters with a droplet discharge head in the forth or fifth invention.

Since the structure is constructed such that the alignment-layer material is applied with a droplet discharge head, the thickness of the alignment layer is constant, thus providing a stable quality.

A seventh invention is characterized in that the alignment-layer material is applied onto the color filters by flexography in the fourth or fifth invention.

Since the structure is constructed such that the alignment-layer material is applied by flexography, the time for manufacture can be decreased.

An eighth invention is characterized in that the specific color is blue in the fourth to seventh inventions.

Since the structure is constructed such that the specific color is blue which has relatively low visibility, the visibility of unevenness in alignment can be further decreased.

A ninth invention is characterized by comprising a table for placing a substrate having a plurality of color filters, a droplet discharge head opposed to the substrate and capable of relative movement in two-dimensional directions along the substrate, and a controller for controlling the two-dimensional relative movement of the table and the droplet discharge head, wherein an alignment-layer material discharged from nozzles provided to the droplet discharge head is applied along a preset alignment-layer application train by the relative movement of the substrate and the droplet discharge head such that the lateral front end of the train is located at a position corresponding to a color filter displaying a specific color; and the alignment-layer material is applied along the following alignment-layer application train such that the lateral rear end of the train is overlapped with the front end of the alignment layer applied to the preceding alignment-layer application train and the lateral front end is located at a position corresponding to the color filter displaying a specific color.

Since the structure is constructed such that the overlapped portion of the alignment layer is set to a position corresponding to a color filter displaying a specific color in manufacturing a color-filter substrate, manufacture is facilitated and atomization is promoted.

A tenth invention is characterized in that the specific color is blue in the ninth invention.

Since the structure is constructed such that the specific color is blue which has relatively low visibility, the visibility of unevenness in alignment can be further decreased.

According to the present invention, even when an alignment-layer material is applied several times, streak unevenness in alignment generated at the boundary thereof is difficult to see from the exterior, thus improving the quality of products.

DETAILED DESCRIPTION OF PREFERRED EMBODIMENTS

Figure 1:
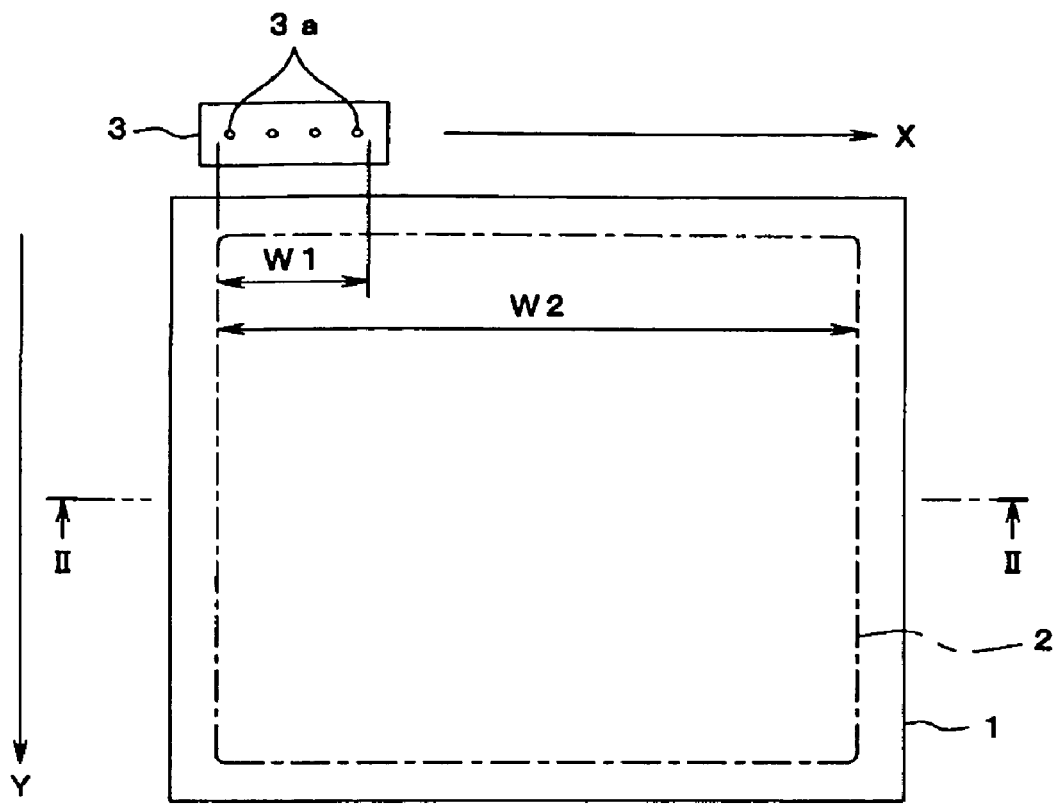
FIG. 1 is a front view of a color-filter substrate according to an embodiment of the present invention.
Figure 2:
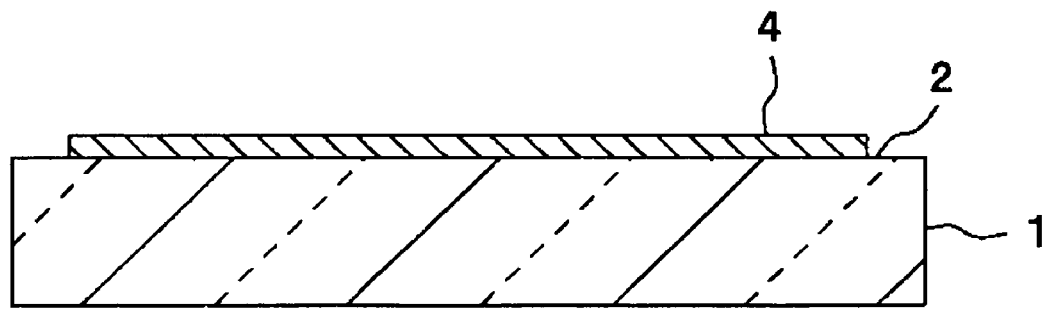
FIG. 2 is a cross-sectional view of the same, taken along line II-II of FIG. 1.

An embodiment of the present invention will be described hereinbelow with reference to the drawings. FIGS. 1 to 7 show an embodiment of the invention. FIG. 1 is a front view of a color-filter substrate. FIG. 2 is a cross-sectional view of the same, taken along line II-II of FIG. 1.

Numeral 1 in the drawings denotes a color-filter substrate. The color-filter substrate 1 is provided to opposing substrates of, for example, a liquid crystal device. The color-filter substrate 1 has a plurality of color filters R, B, and G which are colored in the three primary colors of light, red (R), blue (B), and green (G), respectively, in a specified pattern and also has an alignment-layer application area 2 thereon.

An alignment-layer material is applied to the alignment-layer application area 2 with a droplet discharge head 3 to form an alignment layer 4. The alignment-layer material applied on the color-filter substrate 1 and the alignment layer 4 formed by the alignment-layer material dried and solidified are shown in the same shape on the drawings. Accordingly, numeral to be given to the alignment-layer material is omitted hereinafter for convenience.

Figure 3:
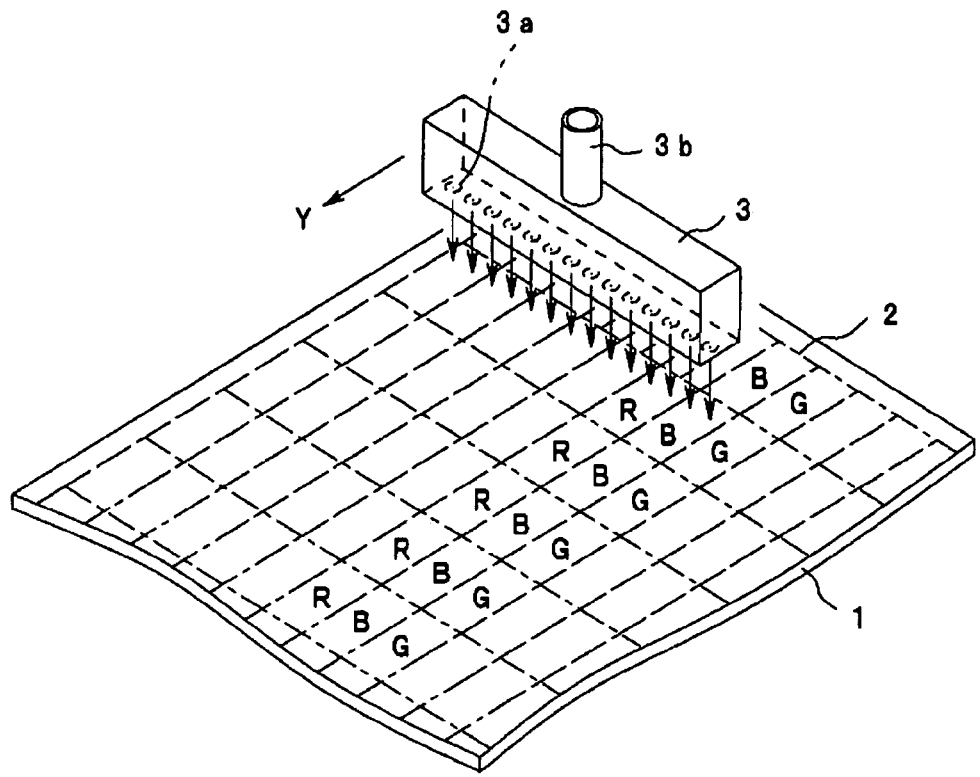
FIG. 3 is a perspective view of the state in which an alignment-layer material is applied onto a color filter with a droplet discharge head.

Referring to FIG. 3, the droplet discharge head 3 which applies an alignment-layer material to the surface of the color-filter substrate 1 has one or multiple trains of nozzles 3a. An alignment-layer material held in an ink tank (not shown) is supplied to each nozzle 3a through a supply port 3b.

For the alignment-layer material, the same as that used in the general flexography, such as polyimide, is used. The viscosity and the discharge amount of one droplet are determined in consideration of a spread when applied to the color-filter substrate 1. Specifically, as shown in FIG. 4(a), the viscosity of the alignment-layer material and the discharge amount of one droplet of the nozzle 3a are set by experiment etc. so that the alignment-layer material applied to the color-filter substrate 1 is not dispersed on the color-filter substrate 1 but can be dried and solidified at a preset thickness.

A table (not shown) for placing the color-filter substrate 1 and the droplet discharge head 3 can make a relative movement in two dimensional directions (X, Y) with a controller (not shown). The alignment-layer material discharged from the nozzles 3a of the droplet discharge head 3 is applied to the entire alignment-layer application area 2 of the color-filter substrate 1 by the relative movement of the table and the droplet discharge head 3.

In this case, when the effective discharge width WI of the nozzles 3a of the droplet discharge head 3 is smaller than the X-direction effective width W2 of the alignment-layer application area 2 of the color-filter substrate 1, as shown in FIG. 1, the droplet discharge head 3 is reciprocated along preset multiple alignment-layer application trains to apply the alignment-layer material onto the entire alignment-layer application area 2.

More specifically, one of the table and the droplet discharge head 3 placed above the color-filter substrate 1 placed on the table, opposed thereto with a predetermined space therebetween, is moved in the direction of arrow Y relative to the color-filter substrate 1, and the first alignment-layer application train of the color-filter substrate 1 is scanned with the droplet discharge head 3. The droplet discharge head 3 is then moved a specified pitch in the direction of arrow X relative to the color-filter substrate 1 by the relative movement of the table and the droplet discharge head 3, thereby scanning the second alignment-layer application train.

The entire alignment-layer application area 2 on the color-filter substrate 1 is scanned by repeating that process, during which the alignment-layer material discharged from the nozzles 3a of the droplet discharge head 3 is applied onto the color-filter substrate 1, thereby forming the alignment layer 4 on the entire alignment-layer application area 2, as shown in FIG. 2.

When the alignment-layer material is applied to a preceding alignment-layer application train and then to the following alignment-layer application train with the droplet discharge head 3, the alignment-layer material applied to the preceding alignment-layer application train has been dried and solidified to form a alignment-layer train 4a or on the way to forming the alignment-layer train 4a. Accordingly, in order to eliminate the boundary with the front end (hereinafter, referred to as a lateral front end) L1 in the direction of movement along the X-direction of the alignment-layer train 4a formed in the preceding alignment-layer application train, as shown in FIG. 4b, when the alignment-layer material is applied to the following alignment-layer application train, the rear end (hereinafter, referred to as a lateral rear end) L2 in the direction of movement along the X-direction of the alignment-layer material applied to the following alignment-layer application train is overlapped with the lateral front end L1 of the alignment-layer train 4a applied to the preceding alignment-layer application train, thereby forming an overlapped portion 4c with an overlap width W3.

As a result, the overlapped portion 4c (refer to FIG. 4(b)) is produced between the lateral front end L1 of the alignment-layer train 4a formed in the preceding alignment-layer application train and the lateral rear end L2 of the alignment-layer material formed in the following alignment-layer application train. The overlapped portion 4c is different in thickness from the alignment layer of the other parts, tending to affect the pre-tilt angle of liquid crystal, which can be viewed as streak unevenness in alignment from the exterior.

Therefore, the embodiment is constructed such that when an alignment-layer material is applied onto the color-filter substrate 1 with the droplet discharge head 3, the relative movement of the table and the droplet discharge head 3 is set so that the overlapped portion 4c is produced at a portion corresponding to a specific color arrangement of the three primary colors (R, B, and G) which construct a color filter to be used for a color liquid crystal device. The specific color is preferably blue (B). Blue (B) is known to be generally lower in visibility than the other two colors (red and green) and difficult to view as luminance difference even if streak unevenness in alignment occurs owing to the variation in the thickness of the alignment layer 4.

Figure 4:
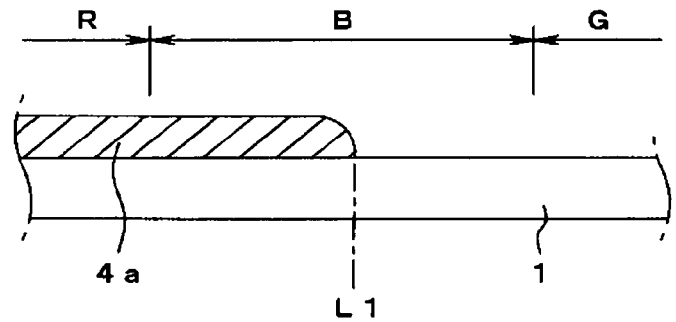
FIG. 4 is an enlarged cross-sectional view of an essential part of the same, showing the state in which an alignment-layer material is applied on the color filter.
Figure 4:
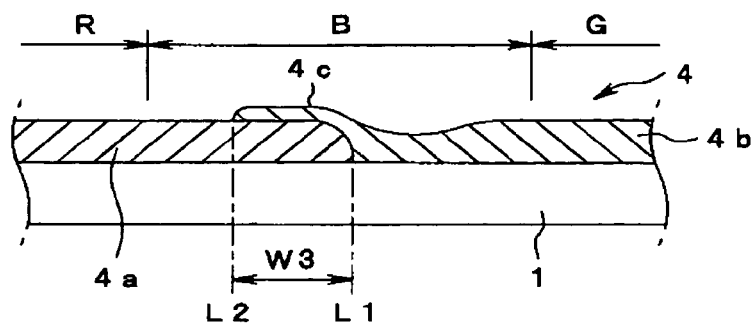
Figure 5:
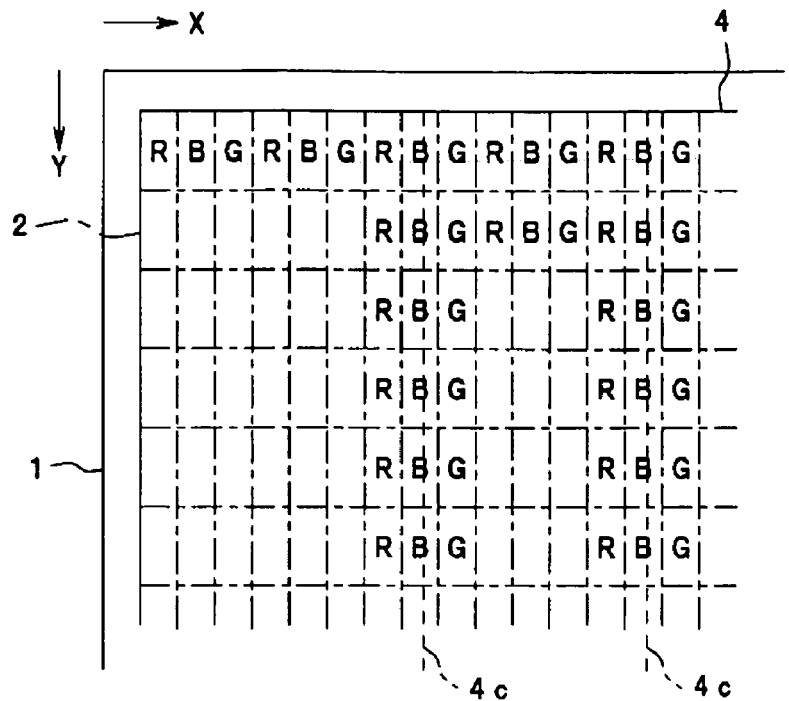
FIG. 5 is a plan view of the arrangement of color filters disposed on the color-filter substrate.
Figure 6:
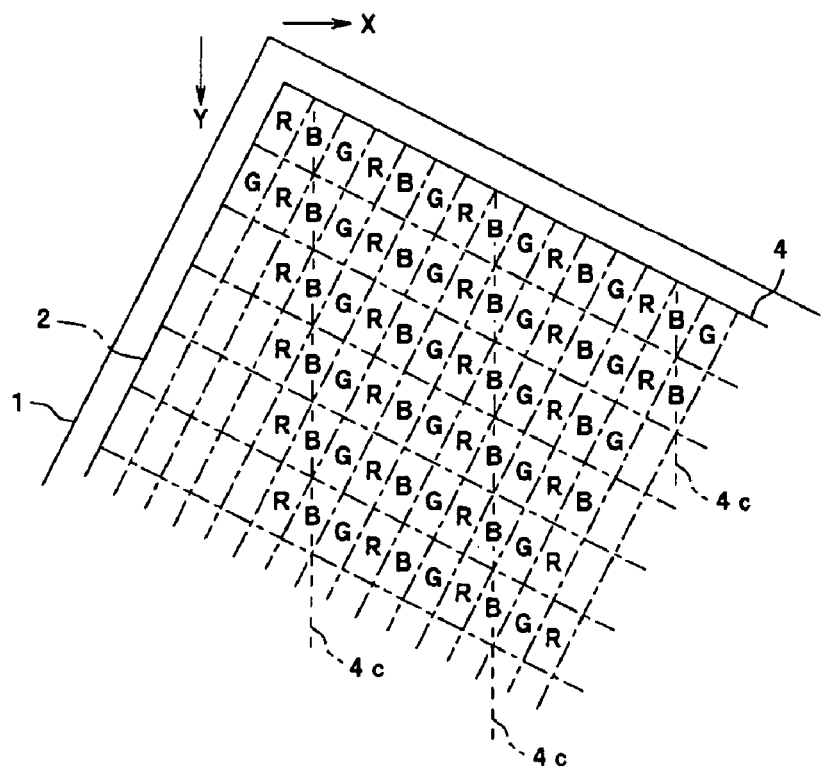
FIG. 6 is a plan view of the arrangement of color filters disposed on the color-filter substrate according to another embodiment.
Figure 7:
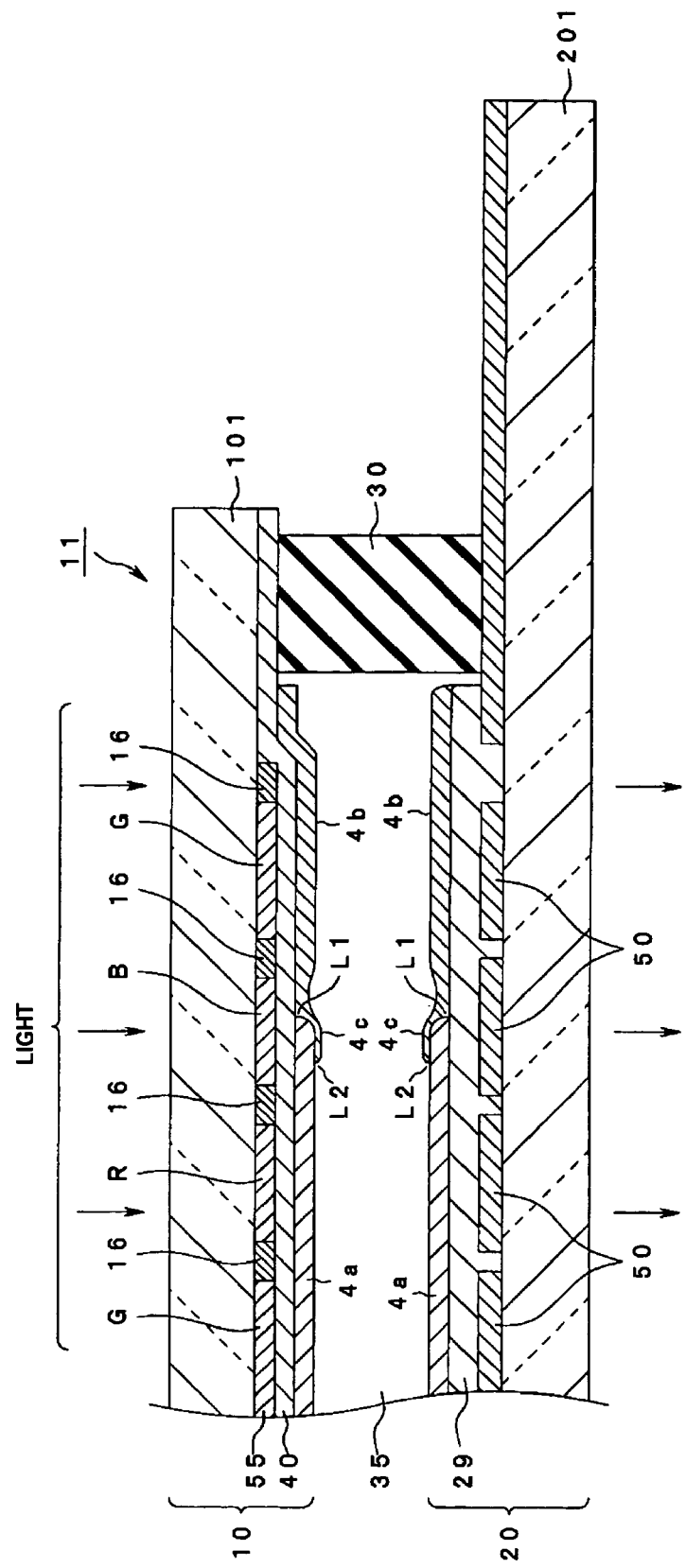
FIG. 7 is a cross-sectional view of a liquid crystal device according to the embodiment.

Accordingly, for example, when the color filters R, B, and G are arranged such that the same colors R, B, and G are arranged in respective columns, as shown in FIG. 5, the relative movement of the table and the droplet discharge head 3 in the direction of the two dimensions (X, Y) is set so that the overlapped portion 4c shown in FIG. 4(b) is formed on a portion corresponding to the train of the color filter B. In that case, as shown in FIG. 6, when the color filters R, B, and G are arranged to be displaced one by one, the color-filter substrate 1 is tilted so that the overlapped portion 4c is formed along the color filter B.

This embodiment is constructed such that when the table and the droplet discharge head 3 are reciprocated to scan the color-filter substrate 1, the overlapped portion 4c (refer to FIG. 4b) formed of the alignment-layer train 4a formed on the preceding alignment-layer application train and the alignment-layer train 4b formed on the following alignment-layer application train passes through a part corresponding to the color filter B which displays blue of the lowest visibility and lowest luminance difference of the color filters R, B, and G. Accordingly, streak unevenness in alignment is difficult to see from the exterior, thus improving the quality of products.

The operation of the embodiment will now be described. The color-filter substrate 1 is first placed on the table with a specified alignment. The color filters R, B, and G provided on the color-filter substrate 1 are then arranged such that the same display colors are aligned along the Y-direction which is the reciprocating scanning direction of the droplet discharge head 3 (refer to FIGS. 6 and 7).

The droplet discharge head 3 is then moved relatively in the Y-direction along a preset coordinate to apply an alignment-layer material discharged from the nozzles 3a of the droplet discharge head 3 onto the first alignment-layer application train of the color-filter substrate 1, in which case the lateral front end L1 of the alignment-layer material is set to the position of the color filter B, as shown in FIGS. 4 and 5.

After completion of the application of the alignment-layer material to the first alignment-layer application train of the color-filter substrate 1, the droplet discharge head 3 is moved in the X-direction to apply the alignment-layer material to the following alignment-layer application train. The stroke of the droplet discharge head 3 in the X-direction for the second and following alignment-layer application trains is set so that the lateral rear end L2 of the alignment-layer material discharged from the nozzles 3a is overlapped with or in contact with the lateral front end L1 of the alignment-layer train 4a formed by the preceding application. The effective discharge width W1 of the second and following nozzles 3a is set so that the lateral front end L1 is located at the position of the color filter B by controlling the number of discharges of the nozzles 3a.

Accordingly, the effective discharge width W1, which is set so that the ends L2 and L1 of the alignment-layer material form the overlapped portion 4c as shown in FIG. 4(b), is set to a value obtained by adding the overlap width W3 of the overlapped portion 4c to a value approximately integer times the interval of pixels, with the arrangement of the color filters R, B, and G as one unit.

The overlap width W3 of the overlapped portion 4c varies and so is not constant under the influence of the deflections at relative reciprocating scanning of the table and the droplet discharge head 3, the accuracy error of the effective discharge width W1 of the nozzles 3a, etc. Therefore, the effective discharge width W1 is set in consideration of the variation factors by experiment etc. so that the overlap width W3 of the overlapped portion 4c is set within the width of the color filter B at the maximum, and such that the ends L1 and L2 come into contact with each other at the minimum.

Accordingly, the alignment-layer material can be applied to the entire alignment-layer application area 2 of the color-filter substrate 1 by reciprocating the droplet discharge head 3 at a specified pitch in the X-direction to scan the color-filter substrate 1. As shown in FIGS. 5 and 6, the overlapped portion 4c (refer to FIG. 4b) of the alignment layer 4 is produced at a position corresponding to the color filter B which displays color with the lowest visibility and lowest luminance difference of the color filters R, B, and G disposed on the color-filter substrate 1.

Consequently, streak unevenness in alignment generated by the overlapped portion 4c of the alignment layer 4 is difficult to see from the exterior, thus improving the quality of products.

It is to be understood that the present invention is not limited to the foregoing embodiment but it is also possible to form the alignment-layer trains 4a and 4b on the color-filter substrate 1 by flexography and repeat it to form the alignment layer 4 on the entire alignment-layer application area 2 of the color-filter substrate 1.

First Embodiment

An embodiment of a liquid crystal device 11 which includes the color-filter substrate 1 according to the embodiment will next be described. The liquid crystal device 11 according to the embodiment includes an opposing substrate 10 and a device substrate 20 opposed to each other. The substrates 10 and 20 are bonded together via a sealing material 30 and have a liquid-crystal sealed area 35 therein. The liquid-crystal sealed area 35 contains liquid crystal (not shown). A light source (not shown) is disposed on the outer surface of the opposing substrate 10.

The opposing substrate 10 includes a plurality of color filters 55 (R, G, and B) colored in red (R), blue (B), and green (G), respectively, in the area on a transparent substrate 101, such as a glass substrate, which corresponds to the intersection of a first electrode pattern 40 and a second electrode pattern 50. In this embodiment, the opposing substrate 10 corresponds to the color-filter substrate 1 of this embodiment.

The color filters 55 (R, B, and G) are aligned in a specified pattern on the transparent substrate 101 (refer to FIG. 5 or 6). The first electrode pattern 40 and the alignment layer 4 are formed in order on the surface of the color filters 55 (R, B, and G). Both of the first electrode pattern 40 and the second electrode pattern 50 are made of a transparent conducting layer, typified by indium tin oxide (ITO). A light shielding layer 16 is formed at the boundary of the color filters 55 (R, B, and G).

The second electrode pattern 50, an overcoat layer 29, and the alignment layer 4 are formed in order on a transparent substrate 201, such as a glass substrate, which constructs the device substrate 20.

The alignment layer 4 is formed on the color filters 55 (R, B, and G) and the overcoat layer 29 by the droplet discharge method according to the embodiment.

The alignment layer 4 formed by the droplet discharge method of this embodiment has the overlapped portion 4c at which the ends L1 and L2 of the adjacent alignment-layer train 4a and 4b are overlapped with each other, at a position corresponding to the color filter 55(B).

Blue which is displayed by the color filter 55(B) has lower visibility and lower luminance difference than colors (R and G) displayed with the other color filters 55 (R and G). Accordingly, when the overlapped portion 4c is disposed at a position corresponding to the color filter 55(B), streak unevenness in alignment generated by the overlapped portion 4c is difficult to see from the exterior, thus improving the quality of products.

Figure 8:
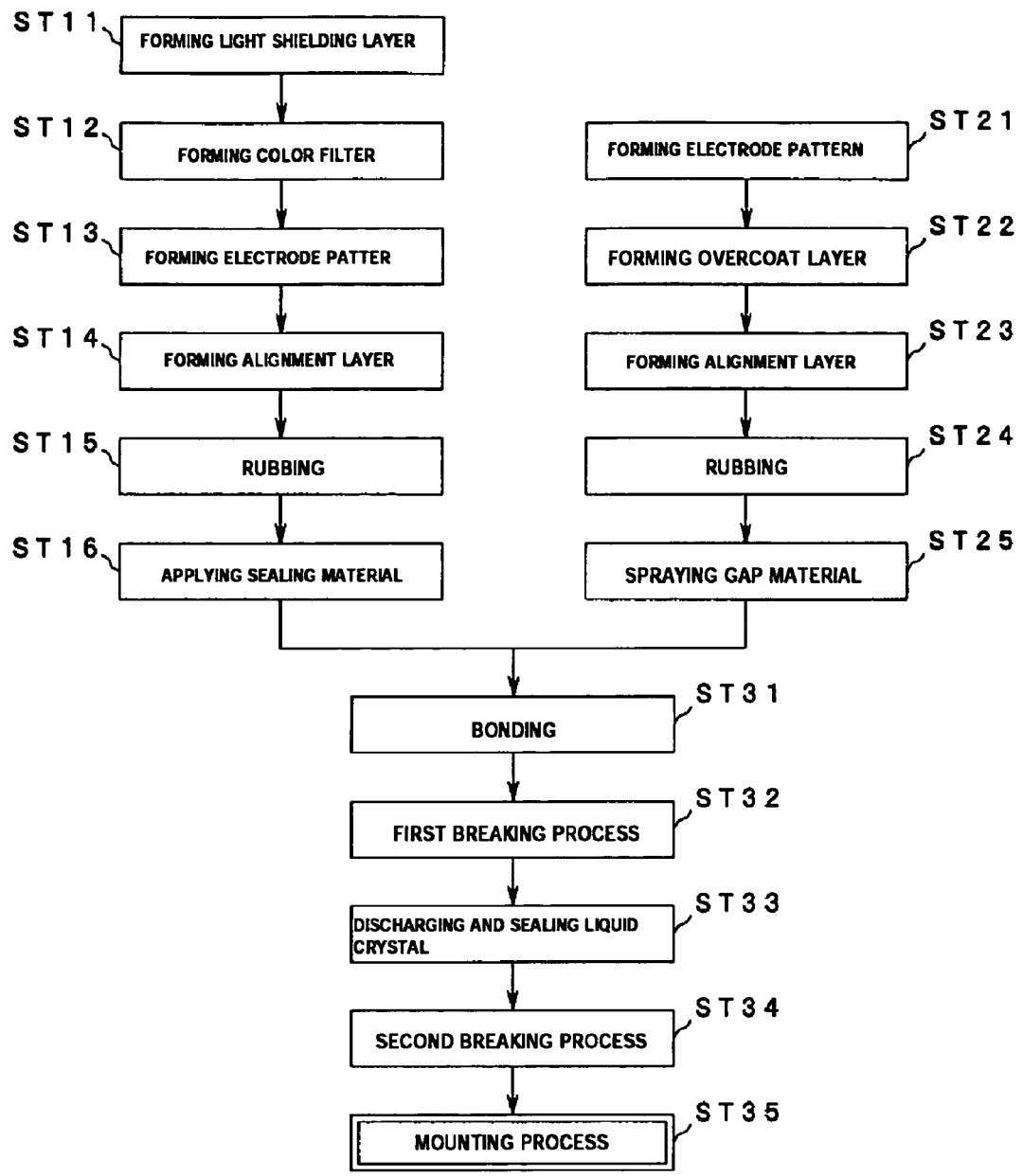
FIG. 8 is a flowchart of a method for manufacturing the liquid crystal device.

Referring now to the flowchart of FIG. 8, a method for manufacturing the liquid crystal device 11 according to the embodiment will be described. In manufacturing the liquid crystal device 11, the electrode patterns 40 and 50 are formed with a semiconductor process, with the opposing substrate 10 and the device substrate 20 in the state of large substrates (not shown) from which a large number of substrates can be taken.

More specifically, a large substrate (not shown) is subjected to step ST11 of forming the light shielding layer 16, step ST12 of forming the color filters 55, step S13 of forming the electrode pattern 40, step ST14 of forming the alignment layer 4, rubbing step ST15, and step ST16 of applying the sealing material 30, in the state of a large substrate from which a large number of transparent substrates 101 can be taken.

Then, a large substrate (not shown) is subjected to step ST21 of forming the electrode pattern 50, step ST22 of forming the overcoat layer 29, step ST23 of forming the alignment layer 4, rubbing step ST24, and step ST25 of spraying a gap material, in the state of a large substrate from which a large number of transparent substrates 201 can be taken.

In bonding step ST31, both the large substrates (not shown) before divided to multiple opposing substrates 10 and device substrates 20 are bonded together to form a large panel structure and then it is cut to strip panel structures in first breaking step ST32.

In liquid-crystal charging and sealing step ST33, after the liquid-crystal sealed area 35 (refer to FIG. 7) formed in the strip panel structure is filled with liquid crystal and then sealed. Subsequently, in second breaking step ST34, the strip panel structure is cut into the liquid crystal devices 11 and then, in mounting step ST35, a flexible substrate etc. are mounted to each liquid crystal device 11.

In step ST14 of forming the alignment layer 4, the alignment-layer trains 4a and 4b are formed on every train by the droplet discharge method to form the alignment layer 4 on the entire alignment-layer application area 2 finally. The overlapped portion 4c formed at the adjacent ends L1 and L2 is formed on the color filter 55(B), so that streak unevenness in alignment generated by the overlapped portion 4c is difficult to see from the exterior, thus improving the quality of the products.

Although the embodiment has been described for the alignment layer 4 formed on the opposing substrate 10, the alignment layer 4 formed on the device substrate 20 has also the same structure. Specifically, in step ST23 of forming the alignment layer 4 on the transparent substrate 201 of the device substrate 20, the overlapped portion 4c of the alignment-layer trains 4a and 4b is formed at a position corresponding to the color filter 55(B) (the position directly below the color filter 55(B) shown in FIG. 7), as in step ST14 of forming the alignment layer 4 on the opposing substrate 10. Since the overlapped portion 4c of the alignment-layer trains 4a and 4b is formed directly below the color filter 55(B), also the streak unevenness in alignment generated by the overlapped portion 4c is difficult to see from the exterior.

What is claimed is:

1. An apparatus for manufacturing a color-filter substrate, comprising:
   a table for placing a substrate having a plurality of color filters;
   a droplet discharge head opposed to the substrate and capable of relative movement in two-dimensional directions along the substrate; and
   a controller specifically programmed to control the two-dimensional relative movement of the table and the droplet discharge head so that:
   a lateral front end of a first application of the alignment-layer material discharged from nozzles provided to the droplet discharge head is located at a position corresponding to a color filter of a specific color; and
   a lateral rear end of a second application of the alignment-layer material discharged from the nozzles provided to the droplet discharge head overlaps with the lateral front end of the first application of the alignment-layer material.

2. The apparatus for manufacturing a color-filter substrate according to claim 1, wherein the specific color is blue.

* * * * *